United States Patent
Le Sauze et al.

(10) Patent No.: US 7,564,876 B2
(45) Date of Patent: Jul. 21, 2009

(54) METHOD OF RESYNCHRONIZING STREAMS BENEFITING FROM CIRCUIT EMULATION SERVICES, FOR USE IN A PACKET-SWITCHED COMMUNICATIONS NETWORK

(75) Inventors: Nicolas Le Sauze, Bures-sur-Yvette (FR); Ludovic Noirie, Nozay (FR); Emmanuel Dotaro, Verrieres le Buisson (FR)

(73) Assignee: ALCATEL, Paris (FR)

( * ) Notice: Subject to any disclaimer, the term of this patent is extended or adjusted under 35 U.S.C. 154(b) by 565 days.

(21) Appl. No.: 11/166,216

(22) Filed: Jun. 27, 2005

(65) Prior Publication Data

US 2006/0002405 A1 Jan. 5, 2006

(30) Foreign Application Priority Data

Jun. 30, 2004 (FR) .................................. 04 51372

(51) Int. Cl.
*H04J 3/06* (2006.01)
(52) U.S. Cl. ...................................... 370/516; 370/503
(58) Field of Classification Search ................. 370/503, 370/516, 517, 229, 230, 230.1, 518, 519, 370/520, 235, 236, 252, 394, 395, 395.62, 370/400, 401, 508
See application file for complete search history.

(56) References Cited

U.S. PATENT DOCUMENTS

| | | | | | |
|---|---|---|---|---|---|
| 5,208,809 | A | * | 5/1993 | Fergeson et al. | 370/545 |
| 5,220,581 | A | * | 6/1993 | Ferraiolo et al. | 375/226 |
| 5,600,641 | A | * | 2/1997 | Duault et al. | 370/400 |
| 5,761,203 | A | * | 6/1998 | Morales | 370/418 |
| 6,026,080 | A | * | 2/2000 | Roy | 370/260 |
| 6,052,389 | A | * | 4/2000 | Kim | 370/516 |
| 6,323,784 | B1 | * | 11/2001 | Miyashita | 340/7.2 |
| 6,359,887 | B1 | * | 3/2002 | Brockhage et al. | 370/394 |
| 6,628,605 | B1 | * | 9/2003 | Chang | 370/208 |
| 6,690,891 | B1 | * | 2/2004 | Le Sauze et al. | 398/154 |
| 6,731,649 | B1 | * | 5/2004 | Silverman | 370/466 |
| 6,738,796 | B1 | * | 5/2004 | Mobini | 718/100 |
| 6,894,998 | B1 | * | 5/2005 | Wiss et al. | 370/352 |
| 6,963,561 | B1 | * | 11/2005 | Lahat | 370/356 |

(Continued)

FOREIGN PATENT DOCUMENTS

WO     WO 01/37486 A     5/2001

OTHER PUBLICATIONS

Anonymous, "Circuit Emulation service Definitions, Framework and Requirements in Metro Ethernet Networks," Metro Ethernet Forum, En Ligne!, Apr. 13, 2004, pp. 1-65 XP002303735.

*Primary Examiner*—Aung S Moe
*Assistant Examiner*—Abdullah Riyami
(74) *Attorney, Agent, or Firm*—Sughrue Mion, PLLC

(57) ABSTRACT

A packet-switched communications network (PSN) includes a multiplicity of nodes (Ni) adapted to switch streams of packets benefiting from circuit emulation services, known as CES packets. The network uses a particular method of resynchronizing the CES streams. According to that method, for a CES stream intended to take an associated path (CE) from an ingress node (N1) passing through a set of nodes including a subset of nodes adapted to resynchronize CES streams selectively, effective resynchronization of said stream by a node selected from said subset is conditioned by a value representative of the cumulative jitter suffered by said stream as far as that node.

12 Claims, 1 Drawing Sheet

U.S. PATENT DOCUMENTS

Figure 1:
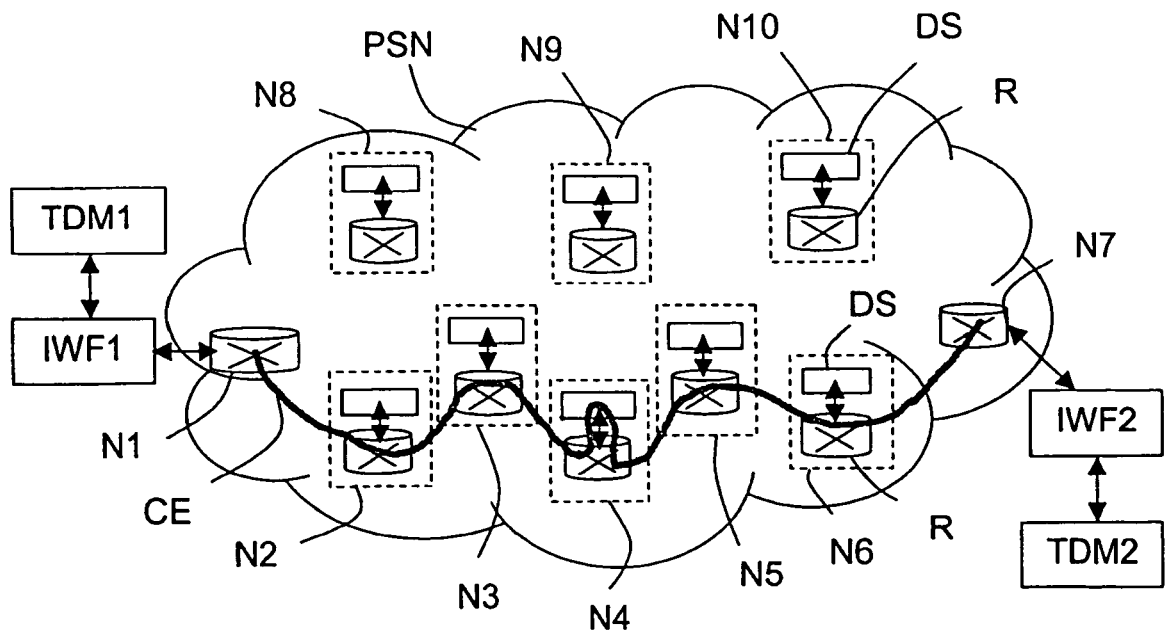

| | | | |
|---|---|---|---|
| 7,130,368 B1 * | 10/2006 | Aweya et al. | 375/376 |
| 2002/0018449 A1 | 2/2002 | Ricciulli | |
| 2002/0131408 A1 | 9/2002 | Hsu et al. | |
| 2002/0191645 A1 * | 12/2002 | Lauret | 370/516 |
| 2003/0135544 A1 * | 7/2003 | Richardson | 709/203 |
| 2004/0047367 A1 * | 3/2004 | Mammen | 370/472 |
| 2004/0114570 A1 * | 6/2004 | Vikberg et al. | 370/351 |
| 2004/0190537 A1 * | 9/2004 | Ferguson et al. | 370/412 |
| 2004/0193821 A1 * | 9/2004 | Ruhovets et al. | 711/167 |
| 2004/0240478 A1 * | 12/2004 | Goren et al. | 370/503 |
| 2006/0034288 A1 * | 2/2006 | Lataretu | 370/395.2 |
| 2007/0002872 A1 * | 1/2007 | Shirasaki | 370/395.61 |
| 2007/0277069 A1 * | 11/2007 | Bonneau et al. | 714/733 |
| 2008/0019706 A1 * | 1/2008 | Levinson et al. | 398/202 |

* cited by examiner

METHOD OF RESYNCHRONIZING STREAMS BENEFITING FROM CIRCUIT EMULATION SERVICES, FOR USE IN A PACKET-SWITCHED COMMUNICATIONS NETWORK

The invention relates to communications networks and to be more precise to transporting streams of synchronous services over packet-switched communications networks.

In the present context, the term "stream" means a set of packets sent by the same source in a network and generally having the same destination. A stream therefore defines a succession of packets of the same connection. A packet of a stream may contain any type of data, including voice data.

Many networks offering synchronous or asynchronous services coexist, in particular synchronous circuit-switched networks, for example TDM or SONET/SDH networks, and asynchronous packet-switched networks, for example MPLS, GMPLS, ATM, Frame Relay (FR), IP and Ethernet networks.

For an asynchronous network to be able to transport synchronous streams, it must achieve certain performance targets, in particular in terms of synchronization. If a synchronous stream must utilize a transmission path of an asynchronous network, means must be provided for resynchronizing the stream so that the synchronization of the packets of the stream coming from the egress node of the path conforms to that of the same packets on the upstream side of the ingress node of said path. At present there are two main resynchronization techniques.

A first resynchronization technique provides each node of the asynchronous network with ingress and egress synchronization interfaces and resynchronizing each stream at the output of each node of the transmission path it takes. Thus TDM traffic (or a TDM stream) is switched asynchronously at each node of a transmission path and then forwarded to the next node after being resynchronized.

The main drawback of this first technique is the high cost of providing each node with complete synchronization interfaces.

A second resynchronization technique resynchronizes the streams only when they reach the egress node of the transmission path in the asynchronous network that they have taken. In other words, there is no synchronization of stream while they are crossing the asynchronous network. Resynchronization at the egress node is generally effected by means of a circuit emulation service (CES) interface, for example a TDM/packet-switched network interworking function (TDM-PSN IWF) interface, as defined by the Pseudo-Wire Emulation Edge To Edge (PWE3) working group of the IETF (for more information see http://www.ietf.org/html.charters/pwe3-charter.html). Streams benefiting from these circuit emulation services are referred to hereinafter as "CES streams".

The main drawback of this second technique is that it can be used only in asynchronous-networks in which the transmission paths (also known as emulated virtual circuits) comprise only a limited number of nodes, typically five nodes or fewer. Each node crossed contributes to random desynchronization of the packets of the stream, in other words is the source of jitter affecting the stream, and if the number of nodes of a transmission path becomes greater than about five, the cumulative jitter suffered by a stream in transit becomes difficult if not impossible to compensate at the egress node because, in the presence of a high level of cumulative jitter, the size of the buffer used by the egress node to resynchronize the circuit emulation service streams is insufficient and/or said buffer becomes very difficult to manage.

The second technique can therefore be used only in certain asynchronous networks, for example small metropolitan area networks.

No prior art resynchronization technique proving entirely satisfactory, the object of the invention is therefore to improve on this situation, in particular in a medium or large network.

To this end it proposes a method of resynchronizing streams of packets for use in a packet-switched communications network including a multiplicity of nodes, ingress nodes and egress nodes of which are adapted to implement circuit emulation services, and a stream of packets benefiting from a circuit emulation service being referred to as a "CES stream", which method is characterized in that, for a CES stream intended to take an associated path from the ingress node passing through a set of nodes including a subset of nodes adapted to resynchronize CES streams selectively, effective resynchronization of said stream by a synchronization node selected from said subset is conditioned by a value representative of the cumulative jitter suffered by said stream as far as that node.

It is important to note that the expression "emulated circuit" refers to a service provided at the extremities of the network. The emulated circuit gives rise to a CES stream within the network that follows a predetermined path in the network which constitutes a connected mode virtual circuit, also known as a connection-oriented virtual circuit, i.e. an MPLS, GMPLS, ATM or Frame Relay (FR) network. Consequently, a given path is associated with an emulated circuit.

The above method may be implemented statically or dynamically.

In a static implementation, each intermediate synchronization node of said subset is selected when setting up the corresponding path.

The value representative of the cumulative jitter is predetermined for each synchronization node of a subset associated with a path as a function of the sum of the maximum jitter that can be introduced by the synchronization node concerned and the maximum jitters that can be introduced by the nodes of said set through which said path passes between the synchronization node concerned and the synchronization node that precedes it. For example, each node from which said sum becomes greater than a selected threshold is determined, and the node that precedes that node is selected as the synchronization node for said path.

Alternatively, the value of the instantaneous local jitter is determined at each node of the set through which a given path passes, after which each node of said subset for which the sum of the value of its instantaneous local jitter and the values of the instantaneous local jitters of the nodes of the subset through which said path passes between it and the synchronization node that precedes it is greater than a selected threshold is determined, and the node that precedes it is selected as said synchronization node.

In a dynamic implementation, each synchronization node of the subset may be determined as a CES stream progresses along a path associated with an emulated circuit. In this case, determining said nodes consists in estimating, at each node through which a path carrying a stream passes, the value of the sum of its instantaneous local jitter and the jitters introduced by the nodes of the subset through which said path passes between it and the synchronization node that precedes it, then comparing that sum to first and second thresholds; if said sum is less than the second threshold the next node of said path is considered, whereas if said sum is between said first and second thresholds, the node concerned is selected as the synchronization node for said path. In the presence of a stream exceeding the first threshold, an error is reported to the network manager, as this situation should not arise.

For example, it is possible to estimate at each node the value of the local instantaneous jitter that it introduces as a function of one or more of its local parameters, for example the level of use of the buffer that it uses to process CES streams.

Finally, whether the implementation is static or dynamic, the threshold value(s) determining the need for resynchronization to be applied to a CES stream received in a node of the subset may additionally be selected as a function of the quality of service (QoS) associated with said stream.

The invention is particularly well suited, although not exclusively so, to connection-oriented asynchronous networks, for example MPLS, GMPLS, ATM and Frame Relay (FR) networks.

Figure 2:
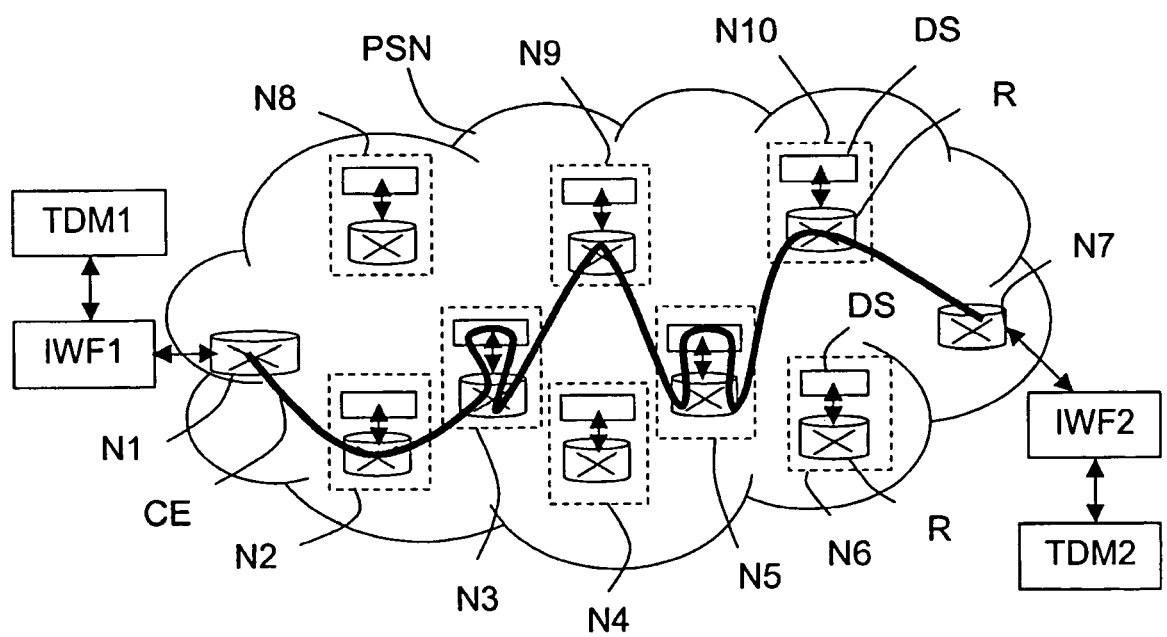

Other features and advantages of the invention will become apparent on reading the following detailed description and examining the appended drawings, in which:

FIG. 1 is a diagram of one example of an asynchronous PSN using a method of the invention in which the synchronization nodes of a subset are defined statically, and FIG. 2 is a diagram of one example of an asynchronous PSN using a method of the invention in which the synchronization nodes of a subset are defined dynamically.

The appended drawings constitute part of the description of the invention and may, if necessary, contribute to the definition of the invention.

An object of the invention is to enable distributed resynchronization of streams benefiting from circuit emulation services, also known as CES streams, within an asynchronous packet-switched network (PSN).

An asynchronous network in which a distributed resynchronization method of the invention may be used is described first with reference to FIG. 1.

That asynchronous network is a connection-oriented packet-switched network, for example a MultiProtocol Label Switching (MPLS) network or a generalized MPLS (GM-PLS) network. However, the invention is not limited to this type of network, of course. It relates to all networks providing asynchronous services and in particular packet-switched networks.

The packet-switched network comprises a multiplicity of network equipments constituting nodes Ni (in the present example i=1 to 10, but i can take any value greater than or equal to 3, and preferably greater than 5). These nodes Ni are connected to each other and are responsible for routing streams, in particular CES streams, between them, so that they can cross the packet-switched network.

The nodes Ni are referred to in the art as packet switches, for example label switch routers R.

Of these nodes Ni, certain constitute what are referred to ingress nodes and egress nodes, which are placed at two "extremities" of the packet-switched network and are each connected to a network providing synchronous services, for example a time division multiplex (TDM) network or a SONET/SDH network. An ingress node is coupled to an egress node via a transmission path defining a virtual connection passing through a set of nodes of the packet-switched network.

For simplicity, the set of nodes defining a transmission path intended to transmit CES streams, and therefore associated with an emulated circuit, is referred to hereinafter as an "emulated virtual circuit".

In the example shown in FIG. 1, as in FIG. 2, an emulated virtual circuit CE connects the node N1 to the node N7. In this example, the node N1 is connected to a first TDM network (TDM1) via a services interface IWF1 and constitutes the ingress node of the emulated virtual circuit CE. The node N7 is connected to a second TDM type network (TDM2) via a services interface IWF2 and constitutes the egress node of the emulated virtual circuit CE. Thus in this example the emulated virtual circuit CE passes through the nodes N1 to N7.

The service interfaces IWF1 and IWF2 in this example are of the TDM-PSN type. They use interworking functions (IWF) in particular for "packetizing" (i.e. converting into packets) synchronous data coming from one of the two TDM networks, in order for it to be possible to forward that data to the other TDM network in the form of asynchronous packets via the emulated virtual circuit CE (in the case of IWF1), and finally to provide a synchronous service on the basis of the packets received (in the case of IWF2).

Details of the emulated circuits taken by the circuit emulation service streams can be found in particular on the IETF website, for example in the document "Requirements for edge-to-edge emulation of TDM circuits over Packet Switching Networks (PSN)" available at the Internet address of the IETF working group PWE3 (http://www.ietf.org/html.charters/pwe3-charter.html) and on the Metro Ethernet Forum (MEF) website (at the address http://www.metroethernetforum.org/), for example in the document "Requirements for circuit emulation services in Metro Ethernet Networks".

The method of the invention resynchronizes CES streams that take a given emulated virtual circuit CE from its ingress node (the node N1 in the present example), in a distributed manner and using a subset of nodes of the packet-switched network (the nodes N1 to N7 in the present example). This subset consists of nodes adapted to resynchronize the CES streams selectively. Resynchronization of the stream by a synchronization node selected from this subset is effected as a function of a value representative of the cumulative jitter that the stream has suffered before reaching that node.

It must be remembered that resynchronization is intended to compensate the transmission delay variation suffered by the packets in each node of an emulated virtual circuit CE that they cross as a result of placing the received CES streams in a dedicated buffer. This transmission delay varies from one node to another as a function of the sizes of their respective dedicated buffers and as a function of the levels of use of those dedicated buffers. For a CES stream, this transmission delay variation constitutes a variable delay known as jitter that is cumulative from one node to another and must be cancelled by resynchronization.

A subset of synchronization nodes can be constituted statically or dynamically. Static constitution consists in (pre)determining in advance the synchronization node or nodes of a subset associated with an emulated virtual circuit CE, for example before sending the first CES streams via the emulated virtual circuit CE, and preferably at the time that the emulated virtual circuit CE is set up.

The following procedure may be used to constitute a subset statically. First of all, the maximum jitter that each node of a given emulated virtual circuit CE can introduce is determined, allowing for its constitution, and in particular for the size of its dedicated buffer and/or the maximum level of use thereof. A threshold is then determined beyond which the jitter accumulated by a stream can no longer be easily compensated, and the node from which the sum of the maximum jitters introduced by each of the nodes that precedes it, including its own maximum jitter, is above the threshold is determined. The node that precedes it is then selected as the synchronization node for the emulated virtual circuit CE concerned. This process is then repeated progressively, as far as the egress node (the node N7 in the present example), to determine each synchronization node of the subset responsible for compensating the sum of the maximum jitters from the preceding synchronization node.

Each node selected in the above manner is then configured by the PSN in order systematically to resynchronize each CES stream that it receives from the emulated virtual circuit CE to which it belongs. The nodes that are not selected and form part of the same emulated virtual circuit CE as the selected synchronization nodes route (or switch) the CES streams that they receive transparently, without desynchronizing them.

Accordingly, in this method, the resynchronization resources in the nodes of the entire network are used optimally, that is to say only in the nodes where this is necessary for each stream concerned. The resynchronization resources of the other nodes are then available for processing any other streams that may necessitate resynchronization at the same time.

In the FIG. 1 example, only the node N4 has been selected for resynchronizing the CES streams transmitted in the emulated virtual circuit CE, and consequently constitutes the only intermediate synchronization node of the subset associated with the emulated virtual circuit CE. Of course, resynchronization is also effected at the egress node N7 to compensate jitter accumulated by each CES stream after the synchronization node N4.

The resynchronization time applied at each synchronization node of a subset associated with an emulated virtual circuit CE is preferably predetermined. It may be variable or constant from one node to another of the same subset. The sum of the maximum jitters accumulated between two synchronization nodes can vary and/or the resynchronization capacity can vary from one resynchronization node to another, with the result that it may be preferable to determine a resynchronization time for each synchronization node of the subset associated with an emulated virtual circuit CE.

In the case of static constitution, at the time of setting up said emulated virtual circuit CE, the value of the instantaneous local jitter (also known as the current jitter) is first estimated at each node of a given emulated virtual circuit CE through which a CES stream to be transmitted in the network will have to pass.

This estimation may be effected as a function of the value of one or more local parameters, for example, such as the average level of use of the buffer dedicated to CES streams. To this end, information representative of the current local parameters of the nodes, which are stored in a database of the packet-switched network, may be used.

A threshold is then determined beyond which the jitter accumulated by a stream could no longer be easily compensated, and the node from which the sum of its current jitter and the jitters of each node that precedes it is liable to introduce at the time of the estimate is greater than the threshold is determined. The node that precedes it is then selected as the synchronization node for the emulated virtual circuit CE concerned. This process is then repeated progressively, as far as the egress node (the node N7 in this example), to determine each synchronization node of the subset responsible for compensating the sum of the current jitters from the preceding synchronization node.

The packet-switched network then configures each node selected in this manner to resynchronize systematically each CES stream that it will receive from the emulated virtual circuit CE to which it belongs. The nodes that are not selected and transport the same emulated virtual circuit CE as the selected synchronization nodes route (or switch) the CES streams that they receive transparently, without desynchronizing them.

Dynamic constitution consists in determining the synchronization nodes of a subset, preferably substantially in real time.

This may be effected by determining the synchronization nodes of the subset as the CES stream progresses through the emulated virtual circuit CE.

In this case, at each node through which a given emulated virtual circuit CE carrying a CES stream passes, the value of the sum of its current jitter (also known as the instantaneous local jitter) and the current jitters that the nodes preceding it have introduced is estimated, for example as a function of the value of one or more local parameters of the nodes, such as the instantaneous level of use of their buffers dedicated to CES streams.

This sum is then compared to a first threshold beyond which the jitter accumulated by a stream can no longer be easily compensated and to a second threshold below which resynchronization is of no benefit. If this sum is below the second threshold, the next node of the emulated virtual circuit CE is considered. The node that has not been selected then routes (or switches) the CES stream that it receives transparently, without desynchronizing it. On the other hand, if the sum is between the first and second thresholds, the node concerned is selected as the synchronization node for the emulated virtual circuit CE concerned and is then configured by the packet-switched network to resynchronize the next CES stream that it receives from the emulated virtual circuit CE to which it belongs.

This process is then repeated progressively as far as the egress node (the node N7 in the present example) to determine each synchronization node of the subset responsible for compensating the sum of current jitters from the synchronization node that precedes it. The network immediately configures each node selected for resynchronization.

In the FIG. 2 example, the emulated virtual circuit CE passes through the nodes N1 to N3, N9, N5, N10 and N7 in that order. Two synchronization nodes N3 and N5 selected by the PSN define the subset that is associated with the emulated virtual circuit CE for transferring a CES stream. Of course, further resynchronization is effected at the egress node N7 to compensate the jitter accumulated by the CES stream after the synchronization node N5.

The packet-switched network then selects a subset, possibly a different subset, for the next CES stream, taking account of the evolution of the current capacities of the nodes of the packet-switched network.

The resynchronization time applied at each synchronization node of a subset associated with an emulated virtual circuit CE may be predetermined, for example made equal to the first or second threshold or to an intermediate value.

Alternatively, the resynchronization time applied at a synchronization node may be selected as a function of the estimated value of the jitter accumulated by the received CES stream since the preceding synchronization node. It must be remembered that this accumulated jitter is equal to the sum of the jitters introduced by the nodes preceding a synchronization node and situated after the preceding synchronization node.

In another variant, the resynchronization time applied at a synchronization node may be selected as a function of the first and second thresholds used to select it, which thresholds may differ from one node to another.

It is important to note that, regardless of the implementation (static or dynamic), the value or values of the resynchronization threshold or thresholds to be applied to a received CES stream in a node of a subset may also be selected as a function of the quality of service (QoS) associated with said stream. Accordingly, by varying the number of intermediate synchronization nodes constituting a subset (and/or the various thresholds), the packet-switched network operator can set different levels of jitter corresponding to different clients and/or different levels of quality of service.

To implement a method of the invention, each node Ni of the packet-switched network is provided with a synchronization device DS coupled to the packet-switched network, for example to its network management system (NMS). This kind of synchronization device DS may be embedded directly in the label switching router (or packet switch) R. However, as shown in FIGS. 1 and 2, it may instead be external to the label switching router (or packet switch) R, for example integrated into a dedicated unit and connected to the router.

The synchronization device DS may take the form of electronic circuits, software (or data processing) modules or a combination of circuits and software. For example, each synchronization device DS can take the form of one or more IWF synchronization interfaces.

When a synchronization node receives a CES stream to be resynchronized, it communicates it to its synchronization device DS in order to apply to it the intended resynchronization time, after which the synchronization device DS communicates the resynchronized CES stream to its synchronization node in order to send it to the next node of the emulated virtual circuit CE.

The invention is not limited to the embodiments of the synchronization device DS, the label-switching router (or packet switch) R and the distributed resynchronization method described above by way of example only, and encompasses all variants thereof that the person skilled in the art might envisage that fall within the scope of the following claims.

What is claimed is:

1. A method of resynchronizing streams of packets in a packet-switched communications network including a multiplicity of nodes and a stream of packets ("CES stream") related to a circuit emulation service which takes an associated path from an ingress node which implements circuit emulation services to an egress node which implements circuit emulation services through a set of said network nodes, said method comprising:

selecting a subset of the set of nodes as intermediate synchronization nodes, wherein each intermediate synchronization node of said subset is selected as a function of a value representative of cumulative jitter suffered by said CES stream as far as said intermediate synchronization node, wherein said each intermediate synchronization node resynchronizes said CES stream and sends the resynchronized CES stream to a next node along said associated path, wherein said each intermediate synchronization node of said subset is selected when setting up the associated path, wherein the method further comprises the step of:

determining said value representative of cumulative jitter for one node of the set through which said associated path passes as a function of a sum of a first predetermined maximum jitter that is introduced by said one node and a second predetermined maximum jitter that is introduced by the nodes of said set between said one node and a preceding intermediate synchronization node that precedes said one node, and wherein the method further comprises the steps of:

determining that said sum becomes greater than a selected threshold and selecting a node that precedes said one node as an intermediate synchronization node for said associated path in response to said determination.

2. A method of resynchronizing streams of packets in a packet-switched communications network including a multiplicity of nodes and a stream of packets ("CES stream") related to a circuit emulation service which takes an associated path from an ingress node which implements circuit emulation services to an egress node which implements circuit emulation services through a set of said network nodes, said method comprising:

selecting a subset of the set of nodes as intermediate synchronization nodes, wherein each intermediate synchronization node of said subset is selected as a function of a value representative of cumulative jitter suffered by said CES stream as far as said intermediate synchronization node, wherein said each intermediate synchronization node resynchronizes said CES stream and sends the resynchronized CES stream to a next node along said associated path, wherein said each intermediate synchronization node of said subset is selected when setting up the associated path, and wherein the method further comprises the steps of:

estimating, at one node of said set through which the associated path passes a value of a sum of a jitter introduced by said one node and jitters introduced by nodes of said set through which the associated path passes between said one node and a preceding intermediate synchronization node that precedes said one node, and determining that said sum is greater than a selected threshold, and in response to said determination, selecting a node that precedes said one node as an intermediate synchronization node.

3. The method according to claim 1 characterized in that said each intermediate synchronization node of said subset is determined as said CES stream progresses along the associated path.

4. The method according to claim 3, further comprising the steps of:

estimating, at one node through which the associated path carrying the CES stream passes, a value of a sum of a jitter introduced by said one node and jitters introduced by nodes of the set through which said associated path passes between said one node and an intermediate synchronization node that precedes said one node, and then comparing said sum to first and second thresholds, if said sum is less than the second threshold, considering a following node of said associated path as the one node for repeating previous steps, and if said sum is between said first and second thresholds, selecting the one node as an intermediate synchronization node for said associated path.

5. The method according to claim 2, characterized in that the value of jitter that each one node of the set introduces is estimated at that node as a function of the value of a selected local parameter.

6. The method according to claim 4, characterized in that the value of jitter that one node of the set introduces is estimated at that node as a function of the value of a selected local parameter.

7. The method according to claim 5, characterized in that said local parameter is a level of use of a buffer used by said node to process a multiplicity of CES streams.

8. The method according to claim 1, further comprising the step of selecting said threshold as a function of a quality of service associated with said CES stream.

9. The method according to claim 2, further comprising the step of selecting said threshold as a function of a quality of service associated with said CES stream.

10. The method according to claim 4, further comprising the step of selecting said first and second thresholds as a function of a quality of service associated with said CES stream.

11. The method according to claim 6, characterized in that said local parameter is a level of use of a buffer used by said node to process a multiplicity of CES streams.

12. The method according to claim 1 wherein said set of nodes through which the associated path passes comprises at least one node which is not selected as an intermediate synchronization node, wherein said at least one node sends the CES stream to a next node along said associated path without resynchronizing said CES stream.

* * * * *